UNITED STATES PATENT OFFICE.

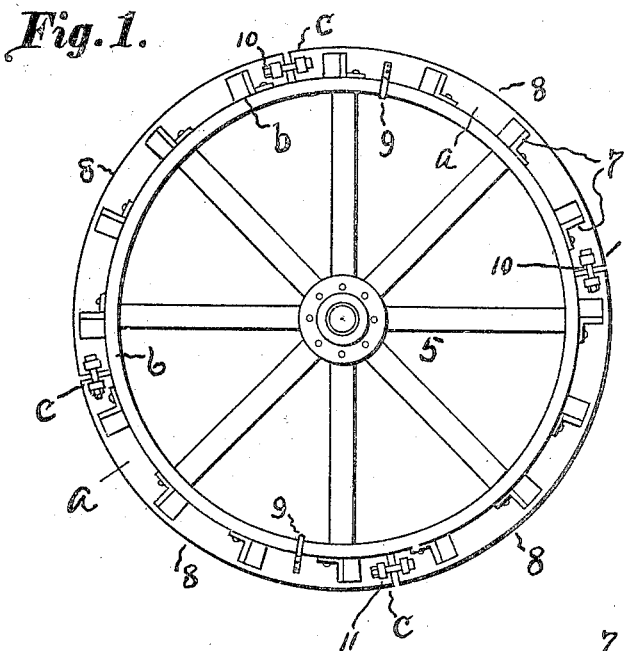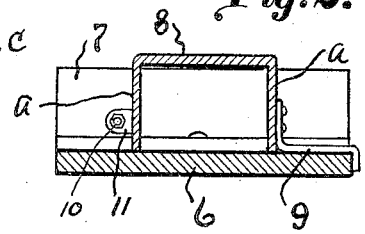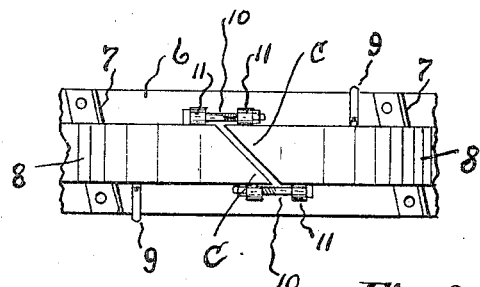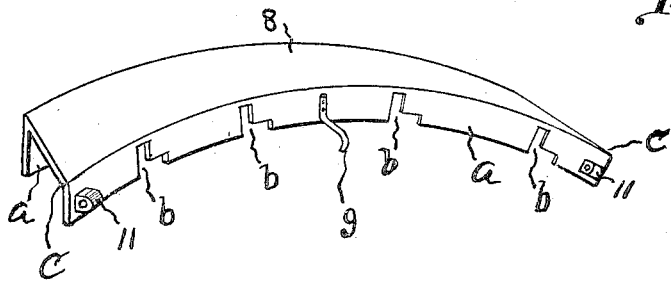

ARTHUR C. AIKIN, OF MASON CITY, IOWA.

LUG-SHIELD FOR TRACTOR-WHEELS.

1,377,794. Specification of Letters Patent. Patented May 10, 1921.

Application filed August 26, 1920. Serial No. 406,216.

*To all whom it may concern:*

Be it known that I, ARTHUR C. AIKIN, a citizen of the United States, residing at Mason City, in the county of Cerro Gordo and State of Iowa, have invented certain new and useful Improvements in Lug-Shields for Tractor-Wheels, of which the following is a specification.

This invention relates to lug-shields for tractor wheels, and has for its object to provide a shield or jacket which may be secured upon the periphery of a tractor wheel to provide a tread or bearing-surface outwardly of the ends of the lugs, said shield being for use when driving the tractor comparatively long distances from one place to another or upon highways, to prevent the lugs from entering the ground, and preventing vibration where the driving might be upon concrete roadways, paving or other hard surfaces.

The invention includes segments adapted to be readily mounted upon or removed from the wheel tire, as may be required, said segments being of channel shape in cross-section, their flanges being provided with recesses adapted to receive the lugs of the tractor wheel and adapted to bear upon the periphery of the wheel, so that stresses will be adequately sustained.

With the foregoing objects in view the invention presents a novel and useful construction and arrangement of parts, as described herein and claimed, and as illustrated in the accompanying drawing, wherein,—

Figure 1 is a view in side elevation of a tractor wheel with the shield mounted thereon. Fig. 2 is a view showing the shield and tire in transverse section. Fig. 3 is a plan view showing a part of two abutting segments of the shield mounted upon the tire of a tractor wheel. Fig. 4 is a perspective view showing one of the segments of the shield.

Referring now to the drawing, the invention is described in connection with a tractor wheel 5, its outwardly projecting, radially disposed lugs on the tire 6 being indicated at 7. I provide a shield outwardly of the tire consisting of segments 8, each being provided, on its concaved side, with a pair of opposed, vertical flanges $a$ having recesses $b$ arranged in pairs and formed therein at longitudinal intervals, to open on their inner edges, the distance apart of the recesses conforming to the distance apart of the lugs 7 of the tractor wheel, each segment also being provided at its ends with a projection $c$, whereby one of its flanges $a$ will be longer than its opposite flange.

Numerals 9 indicate detent-hooks which are provided for the segments, these being mounted upon and extending outwardly from the flanges to catch upon the edges of the tire. In the present instance only one detent-hook is shown for a segment and is considered sufficient, and only four segments are shown for a tractor wheel. The number of segments, however, may be greater or less, as may be found convenient, and depending somewhat on the diameter of the wheel, and the number of detent-hooks may be greater if desired.

It will be noted that the detent-hooks are secured to the flange of greater length of each segment. Since the lugs on the tire of a tractor wheel are generally disposed at acute or obtuse angles to the axis of the wheel, each segment 8 must have a slidable movement both longitudinally and transversely of the tire when mounting it thereon; and in operation, for applying the segments to the tire, they are disposed in alternation at opposed sides of a wheel and are placed with their recesses $b$ receiving the lugs 7, and after they have been disposed upon the tire, midway between the edges thereof, the projections $c$ will be disposed closely adjacent to each other as shown in Fig. 3, and each detent hook will engage an edge of the tire 6, as best shown in Fig. 2.

After the segments have been applied to the tire they are connected at their ends, and any suitable means may be provided for this purpose, in the present instance bolts 10 being shown and being mounted in eyes 11 which are provided for the segments.

After the segments have been thus secured end-to-end they will bear upon the ends of the lugs and the flanges will bear upon the tire, which adequately sustains all stresses directed thereto while the tractor is moving, and excessive jolts, jars and vibration will be prevented.

It will be seen that, after the segments have been mounted as described, they will not become accidentally detached from the wheel, but may be removed whenever desired by causing them to slide transversely of the wheel-tire after their ends have been disconnected. When mounted upon the tire, the segments will have no movement, a transverse movement being prevented, for one direction, by means of the detent-hooks, and the projections $c$, which are disposed in abutting positions, operating to prevent a movement of the segments in an opposite direction.

The advantages in the use of the shield will be appreciated since it is occasionally necessary to drive tractors on hard roads or pavements when loads are not drawn, the result being that the severe jolting may cause injury to the engine and other mechanism, but by use of the herein described shield these objectionable features may be avoided.

While I have described construction in detail, I do not wish to be understood as limiting myself to exactness in this respect, and changes in form, size, proportion and minor details may be made, as found to be of advantage, said changes to be within the scope of the invention as claimed.

I claim,—

In a shield for the lugs of tractor wheel tires, a plurality of segments having end-projections, each segment being provided on its concaved side with longitudinally curved flanges having recesses formed therein, said segments being adapted to be disposed closely adjacent to each other with their recesses receiving said lugs, fastening elements for connecting the adjacent ends of the segments, and hooks carried by the segments for engaging parts of the tire.

In testimony whereof I have affixed my signature in presence of two witnesses.

ARTHUR C. AIKIN.

Witnesses:
 HANNA M. FINETTE,
 ESTHER J. COBB.